(No Model.) 7 Sheets—Sheet 3.

T. J. RYAN.
MOLDING MACHINE.

No. 572,278. Patented Dec. 1, 1896.

Witnesses
Jas. K. McCathran

Inventor
Thomas J. Ryan
By his Attorneys,
C. A. Snow & Co.

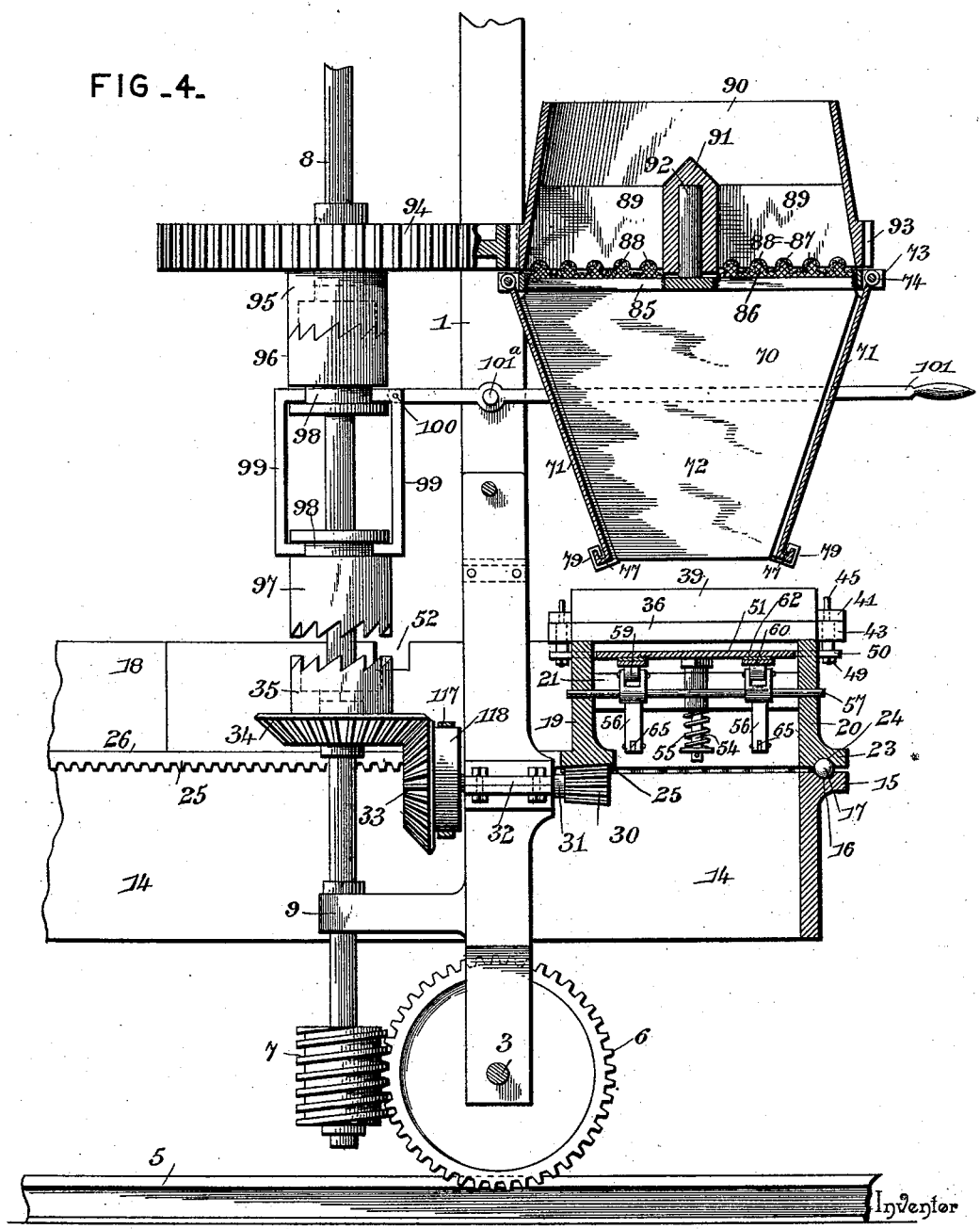

(No Model.)  7 Sheets—Sheet 5.

T. J. RYAN.
MOLDING MACHINE.

No. 572,278. Patented Dec. 1, 1896.

Witnesses
Jas. F. McCathran

Inventor
Thomas J. Ryan
By his Attorneys,
C. A. Snow & Co.

(No Model.) 7 Sheets—Sheet 6.
T. J. RYAN.
MOLDING MACHINE.
No. 572,278. Patented Dec. 1, 1896.
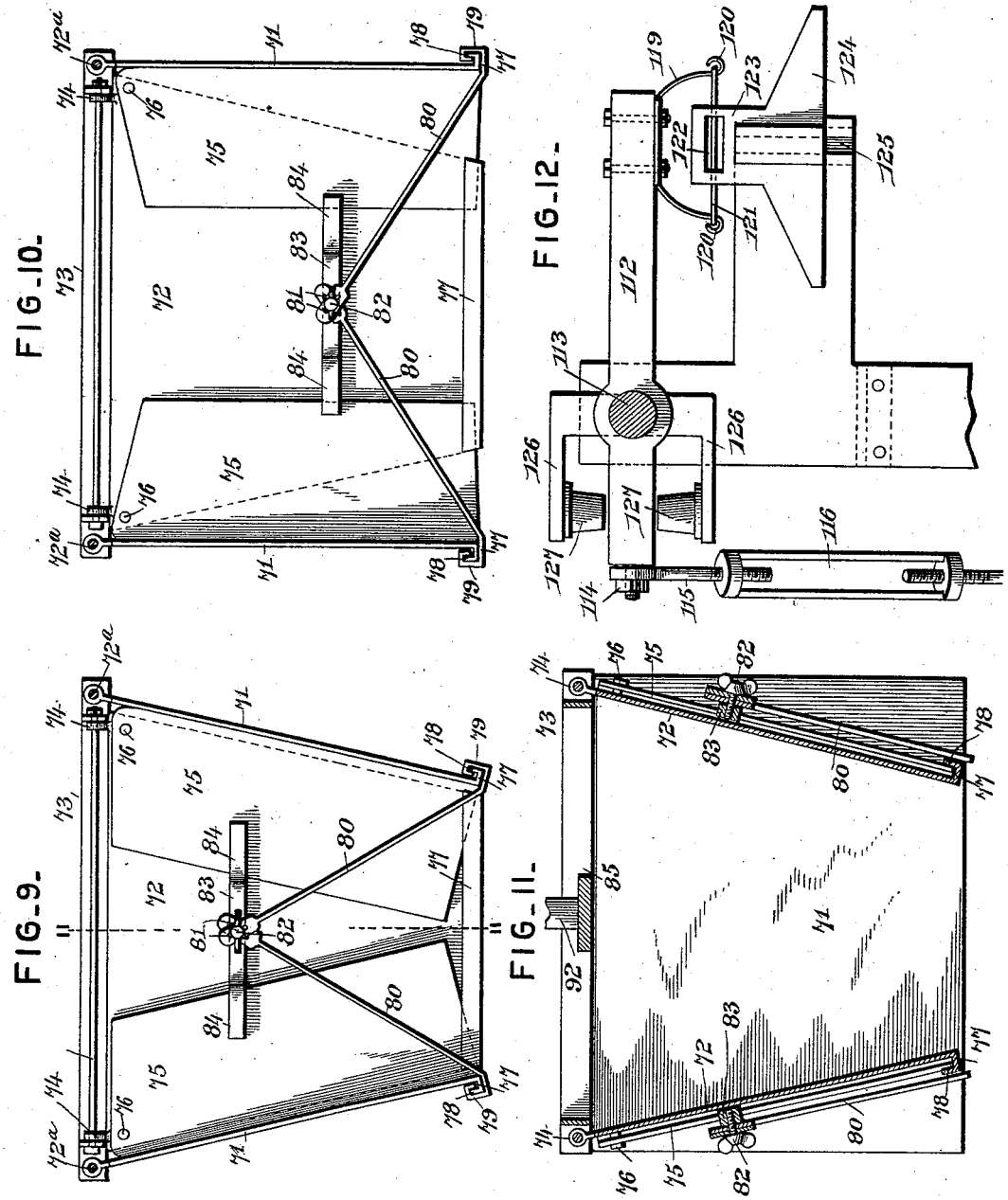
Witnesses
Jas. H. McCathran
D. P. _____
Inventor
Thomas J. Ryan
By his Attorneys,
C. A. Snow & Co.

(No Model.) 7 Sheets—Sheet 7.
T. J. RYAN.
MOLDING MACHINE.
No. 572,278. Patented Dec. 1, 1896.
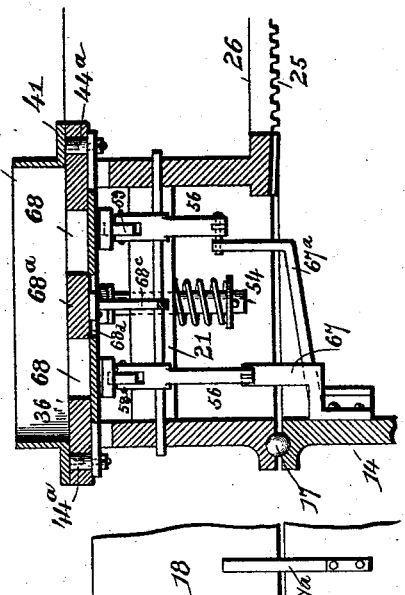
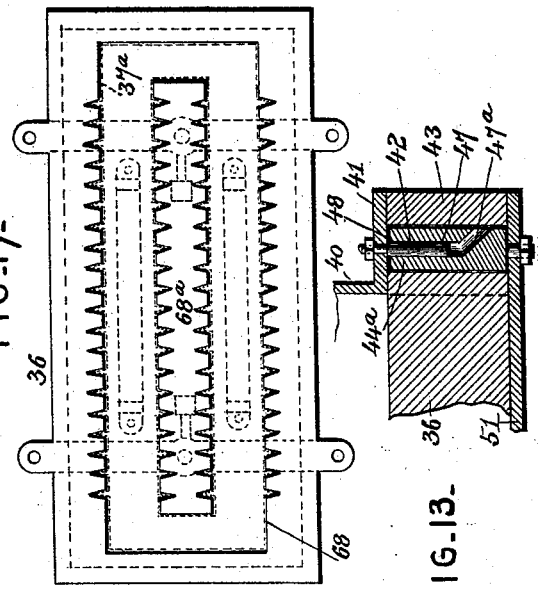
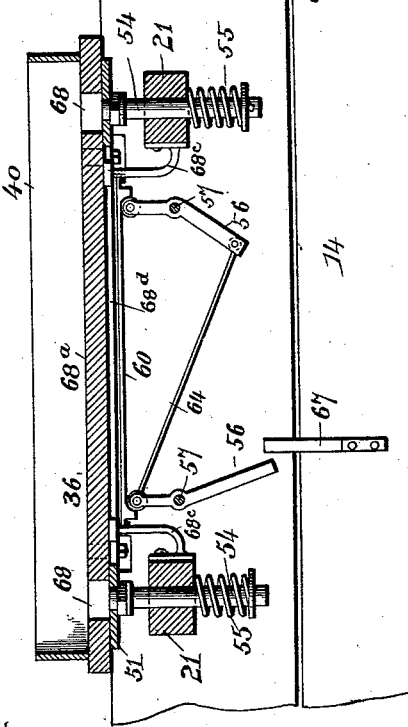
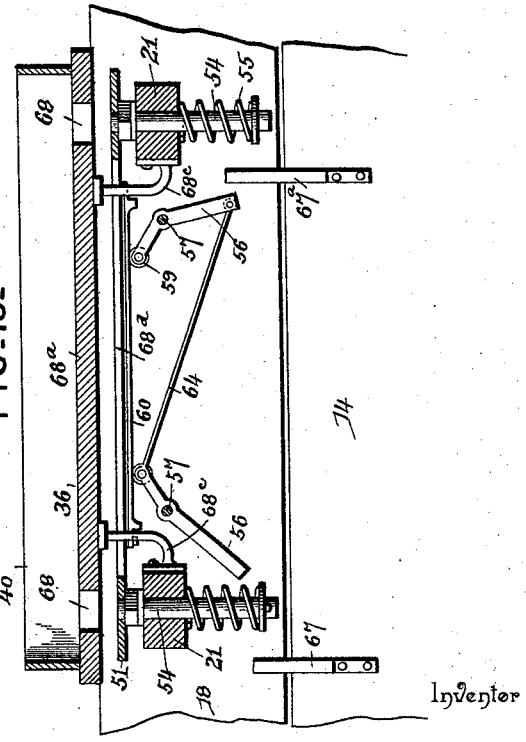
Witnesses
Jas. K. McCathran
By his Attorneys,
C. A. Snow & Co.
Inventor
Thomas J. Ryan

UNITED STATES PATENT OFFICE.

THOMAS JOSEPH RYAN, OF BUFFALO, NEW YORK, ASSIGNOR TO EMILY RYAN, OF SAME PLACE.

MOLDING-MACHINE.

SPECIFICATION forming part of Letters Patent No. 572,278, dated December 1, 1896.

Application filed January 30, 1896. Serial No. 577,406. (No model.)

*To all whom it may concern:*

Be it known that I, THOMAS JOSEPH RYAN, a citizen of the United States, residing at Buffalo, in the county of Erie and State of New York, have invented a new and useful Molding-Machine, of which the following is a specification.

This invention relates to sand-molding machines; and it has for its object to provide certain improvements in machines of this character, rendering the same more efficient in the work of making complete sand molds.

To this end the main and primary object of the invention is to provide a traveling or portable sand-molding machine which shall automatically travel over the floor of a foundry and automatically gather up its own material and sift and pack the same into the separate halves or parts of a flask to form a complete mold, the attendants being required to only place the flasks in position and remove the same when the molds have been formed.

With these and many other objects in view, which will readily appear as the nature of the invention is better understood, the same consists in the novel construction, combination, and arrangement of parts hereinafter more fully described, illustrated, and claimed.

Figure 1:
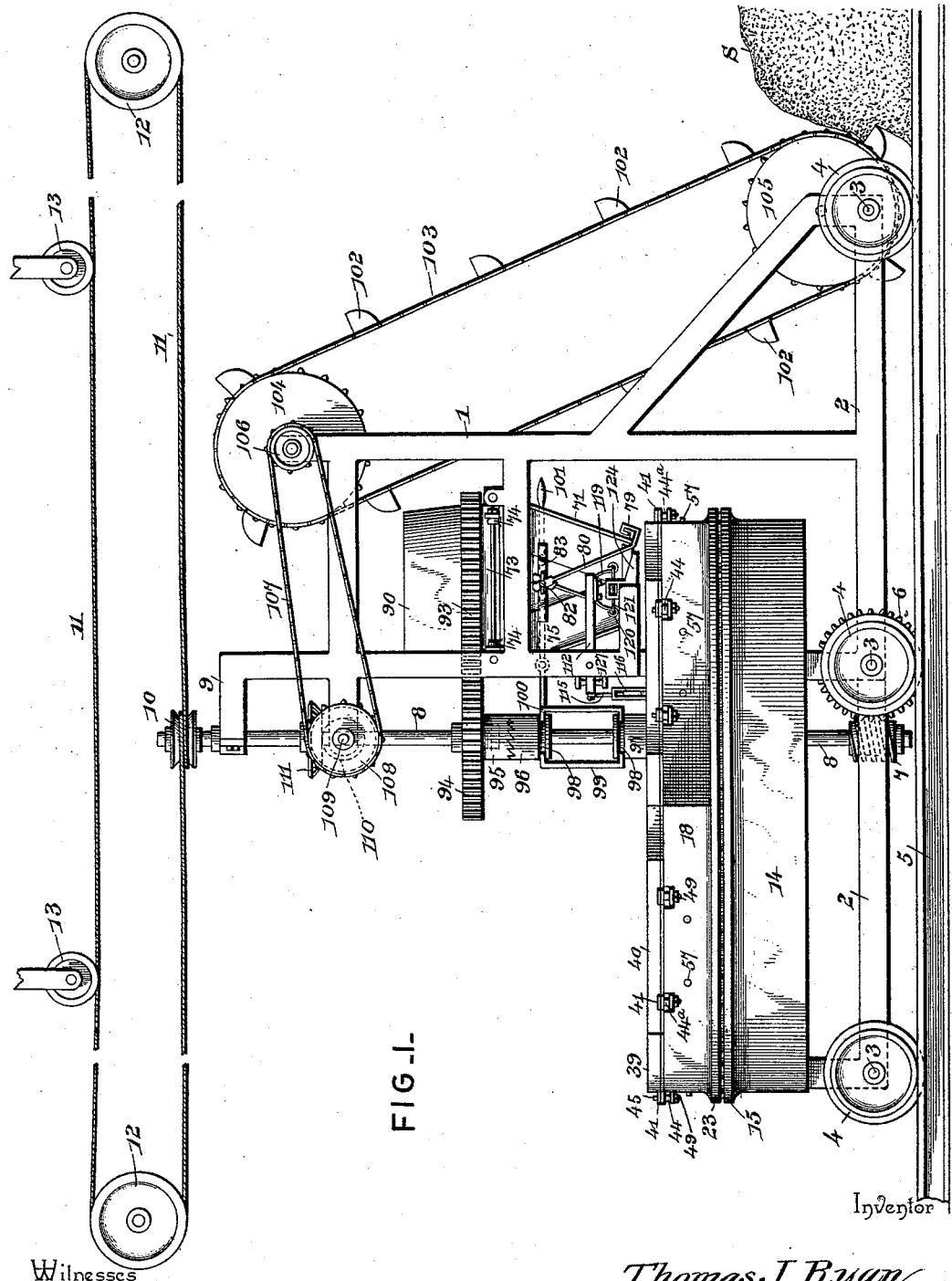
Figure 2:
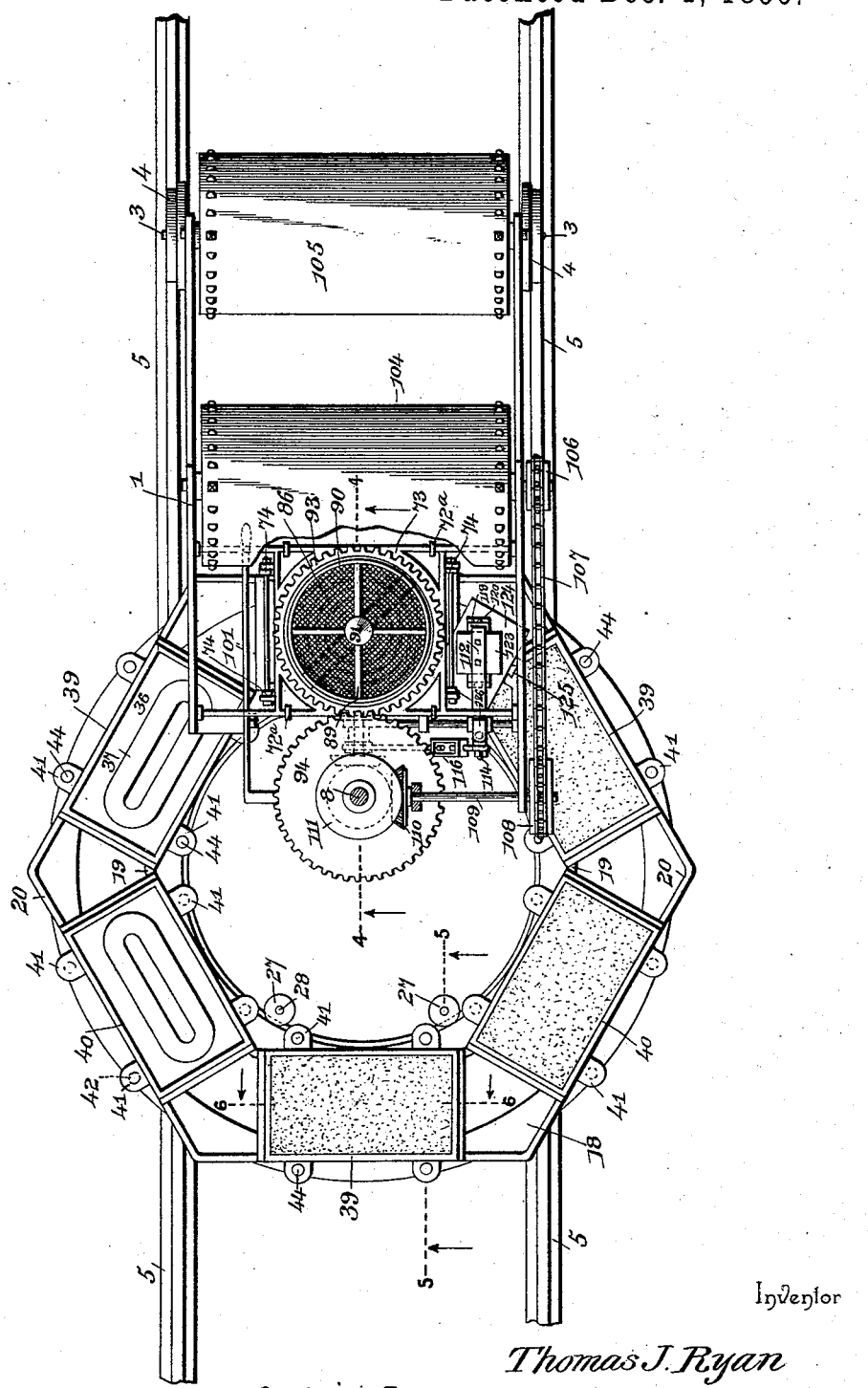
Figure 3:
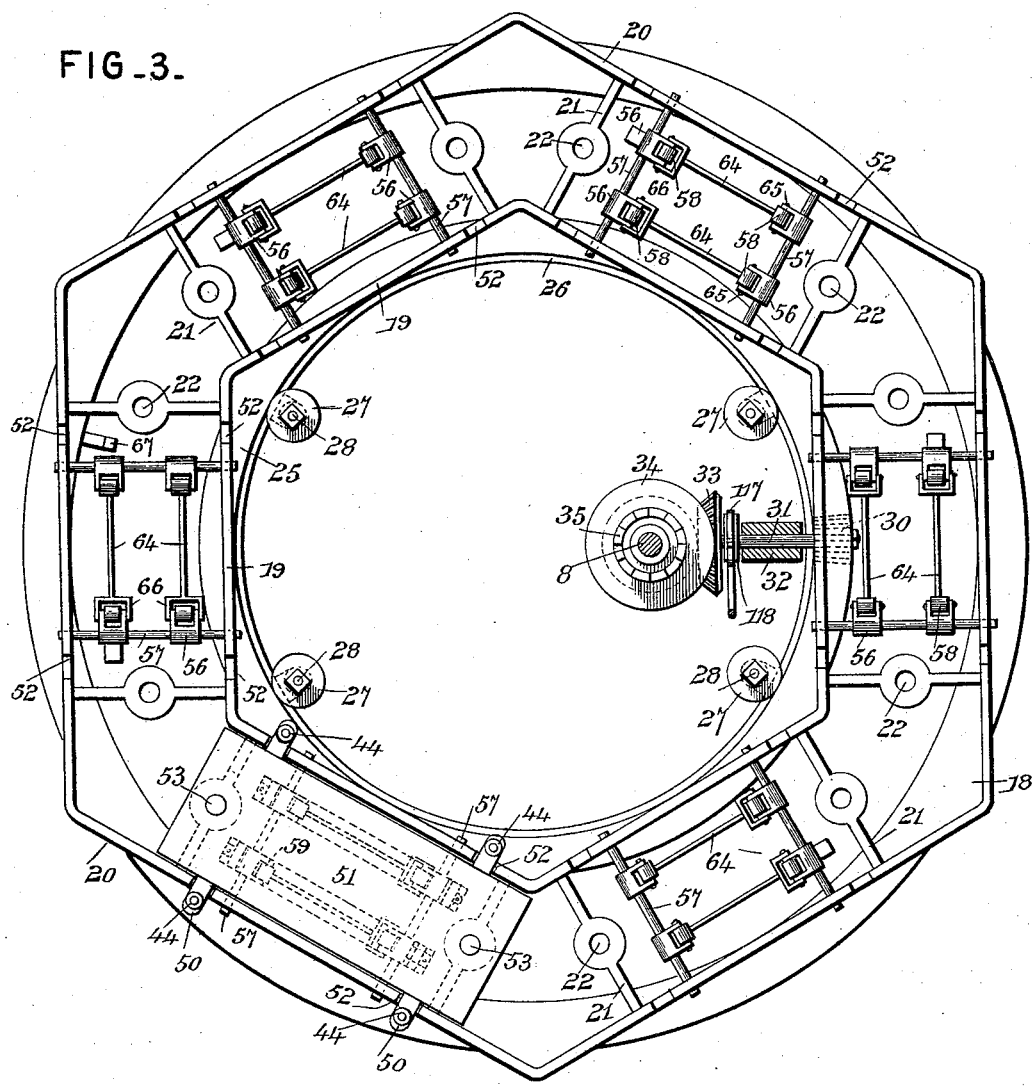
Figure 8:
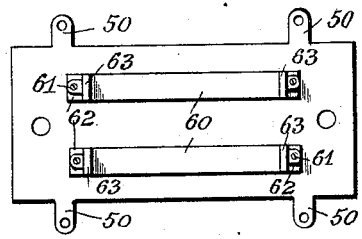
Figure 5:
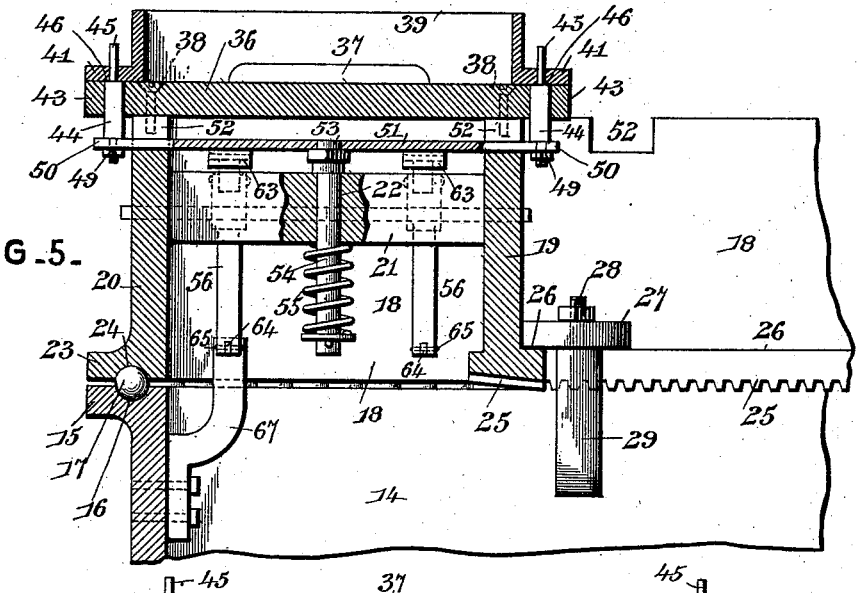
Figure 6:
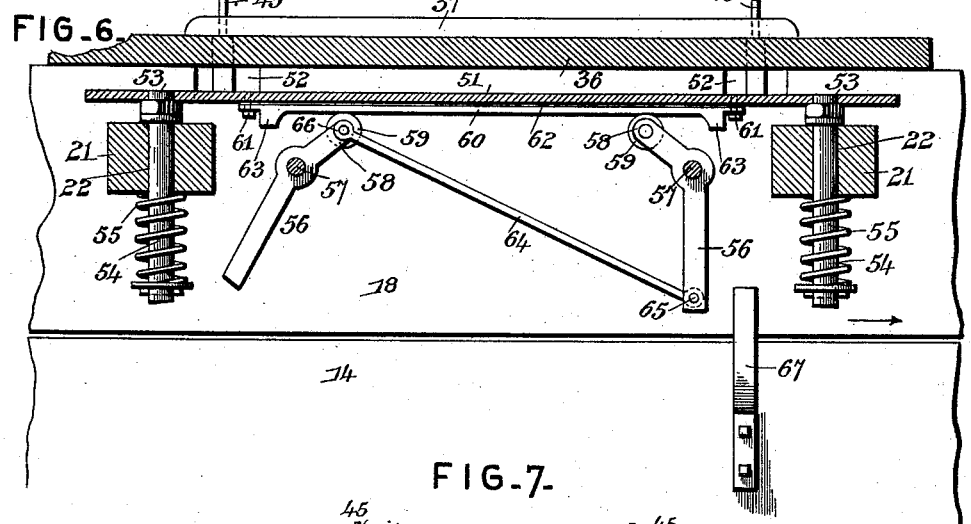
Figure 7:
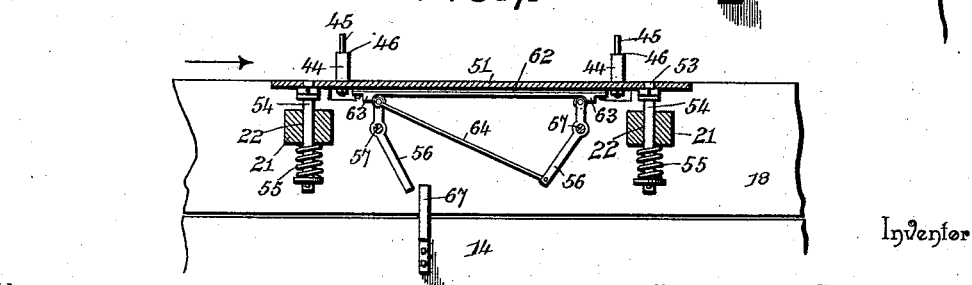

In the drawings, Figure 1 is a side elevation of a sand-molding machine constructed in accordance with this invention. Fig. 2 is a plan view of the same with the bucket sand-elevator removed. Fig. 3 is a plan view of the rotary polygonal mold-table with the superstructure removed to expose the adjusting mechanism for the flasks. Fig. 4 is a detail sectional view on the line 4 4 of Fig. 2. Fig. 5 is a similar view on the line 5 5 of Fig. 2. Fig. 6 is a detail sectional view on the line 6 6 of Fig. 2, showing the lifting-plate in its lowered position. Fig. 7 is a view similar to Fig. 6, showing the lifting-plate in its elevated position. Fig. 8 is a bottom plan view of one of the lifting-plates. Fig. 9 is a side elevation of the adjustable hopper in its contracted form. Fig. 10 is a similar view of the hopper, illustrating the same adjusted to cover a larger feeding area than the adjustment illustrated in Fig. 9. Fig. 11 is a vertical sectional view on the line 11 11 of Fig. 9. Fig. 12 is a detail elevation of the sand-packer arranged at one side of the adjustable hopper for packing the sand into the flask-section. Fig. 13 is a detail sectional view illustrating the hollow or tubular lifting-pins used in connection with the cope-section of the flask. Fig. 14 is a detail sectional view similar to Fig. 6, illustrating the adjusting mechanism for the lifting-plates and the parts coöperating therewith arranged for drop-pattern work. Fig. 15 is a view similar to Fig. 14, illustrating the lifting-plates in their lowered position when such lifting-plates are employed as pattern-plates for drop-pattern work, where the pattern is withdrawn or dropped from the flask instead of the latter being lifted up from the pattern. Fig. 16 is a view similar to Fig. 5, illustrating more clearly the arrangement of the strike-arms for drop-pattern work. Fig. 17 is a plan view of the pattern and lifting plates adapted for use in drop-pattern work in connection with the making of a mold for a flanged radiator-casting.

Referring to the accompanying drawings, the numeral 1 designates an upright traveling frame having a lower truck portion 2, carrying a series of horizontal axles 3, on the opposite extremities of which are mounted the truck wheels or rollers 4, traveling on the track-rails 5, which rails form a track laid on the foundry-floor crosswise or lengthwise thereof in order to provide means for allowing the molding-machine to travel entirely across the foundry and automatically gather up its own material and provide for the automatic formation of the molds in a manner to be hereinafter more particularly described.

One of the wheeled axles of the traveling frame, preferably the central one of such axles, has mounted thereon at an intermediate point a worm-wheel 6, with which meshes a drive-worm 7, fitted on the lower extremity of a centrally-arranged upright main shaft 8. The upright main shaft 8 is mounted in suitable bearing-supports 9 on the frame 1 and has fitted on its extreme upper end above said frame a grooved drive-pulley 10, which receives a wrap of one side portion of an endless cable 11, arranged to pass over suitably-supported and oppositely-located cable-wheels 12 and steadied and maintained at a proper tension by means of suitably-arranged idler wheels or pulleys 13, bearing against one side portion of the cable. By reason of the wrap of the cable 11 around the pulley 10 motion will be communicated to the upright main shaft 8, which will in turn transmit motion to the wheeled axle carrying the worm-wheel 6 and thereby cause the machine to slowly travel over the track in one direction, and when the machine has reached one end of the track on which the same travels it will be obvious that by reversing the wrap of the cable 11 around the drive-pulley 10 the machine can be automatically propelled in opposite directions and carried back to either its original starting-point or in a forward direction, according to the direction in which the cable is wrapped around the said pulley.

The lower truck portion 2 of the traveling frame supports thereon a horizontal stationary base-ring 14, having a widened upper edge 15, provided therein with a continuous circular bearing-groove 16, receiving a series of bearing-balls 17, which form a ball-bearing support for the skeleton rotary or revolving polygonal mold-table 18. The polygonal mold-table 18 essentially comprises the inner and outer polygonal rims 19 and 20, respectively, the parallel sections of the two rims being connected by a pair of cross-bars 21, provided at a central point with vertically-disposed guide-openings 22, the function of which guide-openings will be presently referred to. The outer of said polygonal rims 20 is provided at its lower edge with an enlarged bearing-flange 23, having in its under side a continuous circular bearing-groove 24, receiving the upper portions of the bearing-balls 17, which are thereby confined between the upper edge of the base-ring 14 and the lower edge of the outer rim 20 of the rotary mold-table 18.

The inner polygonal rim 19 of the rotary mold-table is provided at its lower edge with a continuous cog-ring 25, which cog-ring forms at the inner side of the rim 19 a horizontal bearing-shoulder 26, over which bear a series of horizontal guide-rollers 27, mounted on the upper spindle extremities 28 of short supporting-arms 29, fitted to the inner side of the base-ring 14, and said horizontal rollers 27 not only serve to properly steady the rotary mold-table 18 in its rotation, but also properly retain the same on its ball-bearing support.

The cog-ring 25 at the lower edge of the inner rim 20 of the mold-table meshes with a pinion 30, mounted on one end of a short horizontal counter-shaft 31, journaled in a suitable bearing 32 on the frame 1 and having mounted on the end opposite the pinion 30 a vertically-disposed beveled gear-wheel 33, meshing with a horizontally-disposed beveled gear-wheel 34, loose on the upright main shaft 8 and carrying on its upper side a clutch hub or member 35, which will be more particularly referred to as providing means for locking the wheel 34 to the shaft 8, so that motion can be communicated to the table 18 for the purpose of rotating the same in one direction.

By reason of the polygonal form of the skeleton table 18 it will be obvious, by reference to Figs. 2 and 3 of the drawings, that the said table is divided into a successive series of separate sections formed by the parallel portions of the two rims between the angles of the table, and on each of these sections of the table is fitted an imperforate pattern-plate 36, on the upper side of which is suitably secured the half-pattern 37 of the casting to be formed, the drawings illustrating the half-pattern of a radiator-casting. The pattern-carrying plate 36, fitted on each separate section of the polygonal table 18, may be secured to the upper edges of the two rims of the table by means of screws 38 or other suitable fasteners, and it will also be understood that a half-pattern can be secured to both sides of the pattern-plate, so that the latter may be readily reversed for different work, if so desired. The pattern-plates 36, fitted on top of the skeleton table 18, are adapted to support thereon, so as to inclose the pattern 37, the separate sections of an ordinary sand-mold flask, which ordinarily consists of the lower drag-section 39 and the upper cope-section 40, said sections of the flask being provided with meeting ears or lugs 41, the ears of the drag being perforated to receive the downwardly-projecting guide studs or pins 42 of the cope, and the said drag and cope sections of the flask are respectively arranged successively on the mold-table, so as to alternate with each other, that is, one pattern-plate 36 will support the drag-section of the flask, while the immediately succeeding pattern-plate will support the cope-section of the flask, as will be readily understood by those skilled in the art.

The flask-sections are arranged on the pattern-plates 36 so that the ears or lugs 41 thereof will aline with the laterally-projected perforated ears 43, projected in pairs from the opposite side edges of the said pattern-plate 36, and loosely receiving therein the flask-adjusting pins 44 44$^a$. The flask-adjusting pins 44 44$^a$, which snugly register in the perforations of the ears 43, are of a slightly different construction for use in connection with the different sections of the flask, that is, the pins 44, used in connection with the pattern-plate for supporting the drag or lower section of the flask, are of one construction, while the pins 44$^a$, used in connection with the cope or upper section of the flask, are of a different construction. The adjusting-pins 44 for the lower section of the flask are provided with reduced upper extremities 45, adapted to project through the perforated ears of the lower or drag section of the flask, and at the lower end of the reduced upper extremities 45 are formed the shoulders 46, which normally lie flush with the upper face of the pattern-plates 36 and bear under the perforated ears of the lower flask-section to provide for lifting such flask-section above the pattern-plate at the proper time. The adjusting-pins 44ᵃ, working in the perforated ears 43 of every alternate pattern-plate 36, are tubular or recessed, as at 47, to receive the downwardly-projecting guide-studs 42 of the upper or cope section of the flask, and are provided with squared upper ends 48, which bear directly under the ears of said upper or cope section of the flask to provide for elevating the same above the pattern-plate at the proper time. The bores 47 of the pins 44ᵃ terminate at their lower ends in dirt-escape passages 47ᵃ.

By reason of using each pattern-plate with either a set of the pins 44 or 44ᵃ said pins will be arranged in alternate sets to operate in conjunction with the alternating upper and lower sections of the flask, and the said pins 44 and 44ᵃ are bolted or otherwise suitably secured at their lower ends, as at 49, to the outer extremities of the short pin-supporting arms 50, projected laterally from opposite side edges of the lifting-plates 51 and immediately below the perforated ears 43 of the pattern-plates. A lifting-plate 51 is arranged horizontally below each pattern-plate 36, and the pin-supporting arms of the several lifting-plates are arranged to project through and work in the arm-notches 52, formed at the proper points in the upper edges of the inner and outer rims 19 and 20 of the rotary table 18.

Each lifting-plate 51 has rigidly connected thereto, near its opposite end, as at 53, the upper ends of the depending guide-rods 54, arranged to work in the central vertically-disposed guide-openings 22 of the cross-bars 21, previously referred to, and below the said cross-bars 21 the said rods 54 have arranged thereon the coiled springs 55, which normally draw the rods 54 downward and thereby hold the lifting-plate 51 in a depressed position, so that the shoulders or upper ends of the particular set of adjusting-pins carried thereby will be disposed flush with the face of the pattern-plate and directly under the ears of the flask-section resting thereon.

The proper adjustment of the lifting-plates 51 to elevate the flask-section on the pattern-plate is secured by the employment of opposite pairs of oscillating adjusting-levers 56, arranged below each lifting-plate. The opposite pairs of oscillating adjusting-levers 56 are mounted at an intermediate point of their ends on oppositely-located rock-shafts 57, arranged between and journaled at their ends in the inner and outer rims of the rotary mold-table, and said adjusting-levers 56 are provided with upper bifurcated ends 58, in which are mounted the bearing-rollers 59, which bear under the wear-plates 60, fitted to the under side of each lifting-plate.

The wear-plates are removably secured at their ends to the under side of each lifting-plate by means of screws 61 or other suitable fasteners, so that when said plates have become slightly worn the same may be readily removed, so that a paper or similar spacing strip 62 may be interposed between said wear-plates and the lifting-plate, thereby securing a very fine adjustment of the wear-plates. The said wear-plates 60 are arranged in pairs parallel with each other on each lifting-plate and are provided at their opposite extremities with the depending stop-shoulders 63, against which the upper roller ends of the levers 56 rest, so as to prevent the upper portions of the levers from passing beyond their centers, and when the upper roller ends of said levers rest against said stop-shoulders the said upper portions of the lever will remain locked in a vertical position, as illustrated in Fig. 7, so as to hold the lifting-plate in an elevated position.

The directly opposite oscillating adjusting-levers 56, mounted within each section of the rotary table below each lifting-plate, are connected by the inclined connecting-rods 64, each connecting-rod 64 having one end pivotally connected, as at 65, to the lower extremity of one adjusting-lever 56 and its other end pivotally connected, as at 66, to the extreme upper end of the directly opposite adjusting-lever of the opposite pair, and by reason of this particular connection the opposite pairs of adjusting-levers will oscillate in unison, so that their upper roller ends will either move toward or away from each other, according as the lifting-plate is being lowered or elevated.

Normally the upper roller ends of the opposite pairs of levers 56 under each lifting-plate are disposed at an angle toward each other, as illustrated in Fig. 6, so as to allow the said lifting-plate to be drawn or retracted to its lowermost position by the springs 55, and when each section of the rotary table reaches a certain point over the base-ring 14 the lower end of one of the advance levers 56 will strike against a fixed strike-arm 67, fitted to the inner side of the base-ring 14 and projecting upwardly into the path of two oppositely-connected levers 56 under each lifting-plate. When the advance lever referred to strikes against and rides past the fixed strike-arm 67, through the medium of the connecting-rods 64, the opposite pairs of said adjusting-levers will be oscillated in a direction to carry their upper portions to the vertical position illustrated in Fig. 7, thereby elevating the particular lifting-plate directly thereover, so as to adjust the adjusting-pins carried by said lifting-plate in an upward direction to elevate the flask-section, so that the mold can be removed by an attendant. Each lifting-plate is lowered, after being elevated in the manner described, by the lower extremity of the lever 56, directly following the advance lever referred to, striking against the arm 67, thereby throwing the upper roller ends of said levers inward to the positions shown in Fig. 6 of the drawings, and this operation will be hereinafter again particularly referred to.

In certain classes of work known as "drop-pattern" work it is necessary to drop the pattern out of the flask instead of lifting the flask from the pattern, and this result may be accomplished by means of slightly modifying the construction, as illustrated in Figs. 14, 15, 16, and 17 of the drawings. In this modification of the apparatus the pattern $37^a$ (indicated in dotted lines in Fig. 17) is fitted on the upper side of the lifting-plate 51 of each section of the rotary table, and the plate 36, above the plate 51, is provided therein with a pattern-opening 68, through which the pattern $37^a$, carried by the plate 51, may be projected, so as to lie within the flask-section, and also retracted, so as to be dropped or withdrawn from within the flask. In this construction the character of the pins 44 and $44^a$ is unimportant, and the oscillating levers 56 are normally adjusted to a position to hold the plate 51 elevated, so as to project the pattern $37^a$ above the pattern-plate and into the flask-section resting thereon, and when the mold reaches a point where it is to be removed the pattern is dropped or withdrawn from the flask, which result may be accomplished by employing a pair of the fixed strike-arms 67 and $67^a$.

The strike-arms 67 and $67^a$ are spaced apart at such intervals that one of said arms, 67, will be first engaged by the lower end of one of the rear levers 56 below a particular lifting-plate, thereby oscillating such lever in a direction to adjust the upper roller ends of the opposite pairs of levers at an angle toward each other, so as to allow the lifting-plate to be retracted downward and thereby drop or withdraw the pattern carried thereby from the mold. The other of said strike-arms, which may be designated as $67^a$, is arranged in advance of and out of alinement with the strike-arm 67 and is positioned so as to be engaged by an advance one of the levers below a particular lifting-plate, so that the opposite pairs of levers will be straightened up to reëlevate the said lifting-plate after the same has been once lowered in the manner just described. This operation is precisely the reverse of the operation described for elevating the flask from the pattern and the pattern-plate, as will be readily observed by those skilled in the art.

In connection with the arrangement of parts for drop-pattern work it may be explained that the pattern-opening 68 in the plate 36 is shaped to conform with the shape of the pattern $37^a$, supported by the lifting-plate 51, and this pattern is illustrated as being given the shape of a flanged radiator-casting to provide for forming the proper mold to make this casting, and in connection with this particular casting the opening 68 in the plate 36 is given the proper rectangular configuration by arranging centrally within the said opening a center plate $68^a$, which center plate practically forms a part of the plate 36 and corresponds to the opening between the opposite sides of the radiator-casting. The center plate $68^a$ is rigidly supported in position within the opening 68 of the plate 36 by means of the curved bracket-arms $68^c$, arranged at opposite ends of and below the center plate $68^a$. The bracket-arms $68^c$ extend through an opening $68^d$ in the lifting-plate 51, so as not to interfere with the movement of said lifting-plate, and are secured at their upper ends to the under side of the center plate $68^a$ and at their lower ends to one side of the cross-bars 21, which thereby provide a rigid support for the center plate $68^a$ of the plate 36. It will of course be understood that various other forms of opening 68 may be formed in the plate 36, according to the character of the pattern that is designed to be projected through the pattern-opening of the pattern-plate, as will be readily understood by those skilled in the art.

At a point directly opposite the point where the lifting-plate of each section of the rotary mold-table is adjusted up and down is arranged an adjustable sand-feeding hopper 70. The sand-feeding hopper is arranged in a plane directly above the circle of movement of the flask-sections carried by each section of the polygonal mold-table and projects in sufficiently close proximity to the flask-sections to provide for the delivery of a sufficient quantity of sand directly thereinto, so as to cover the half-pattern projected above the pattern-plate. The adjustable hopper 70 essentially comprises a pair of opposite adjustable side plates 71 and a pair of opposite adjustable end plates 72, arranged to work between the opposite ends of the side plates and combining therewith to form a side and end inclosed hopper through which the molding-sand passes and is delivered into the flasks. The opposite adjustable side plates 71 are pivotally suspended at their upper edges, as at $72^a$, from a transverse hopper-supporting frame 73, which is arranged transversely within and secured to the main frame 1 in any suitable manner, and the opposite adjustable end plates 72 are likewise pivotally suspended at their upper edges, as at 74, from the said frame 73, so as to have a swinging adjustment independent of the swinging adjustment of the said side plates 71.

The swinging adjustable end plates 72 have pivotally fitted on their outer sides a pair of corner plates or wings 75, respectively pivoted at their outer upper corners, as at 76, to the opposite upper corners of the end plates 72, on the outer sides thereof, and the said corner-plates 75 have a swinging adjustment inward and outward, so as to always contact with the inner sides of the opposite side plates 71 and close in the corners of the hopper irrespective of the adjustment of the said side plates 71 away from the side edges of the end plates 72, arranged therebetween, and the lower edges of the pivotally-adjustable corner-plates 75 are retained and guided in a proper position within the outturned guide-flanges 77, formed at the lower edges of the said swinging adjustable end plates 72.

The opposite adjustable side plates 71 of the adjustable hopper are provided at their lower edges with a slide-flange 78, slidably engaged by the hooked lower ends 79 of the adjusting-bars 80, arranged in pairs at opposite ends of the hopper. The adjusting-bars 80 are arranged on the outer sides of the swinging adjustable end plates 72 and have their lower hooked ends passed under and around the lower edges of the side plates 71, so as to engage with the slide-flanges 78 thereof, and the other ends of each pair of the adjusting-bars 80 intersect with each other and are slotted, as at 81, at their point of intersection to receive the thumb-screw 82, which also engages a threaded opening formed centrally in a movable slide-bar 83.

There is one of the slide-bars 83 arranged on the outer side of each of the adjustable end plates 72, and said slide-bars 83 are provided with bifurcated ends 84, which slidably engage the inner edges of the pivoted corner-plates 75 on each end plate 72, so that by loosening the thumb-screw 82 and moving the slide-bars 83 either up or down it will be obvious that the corner-plates 75 will be simultaneously adjusted against the inner sides of the side plates 71, together with the spreading of said side plates to any adjusted position, and by swinging the end plates 72 toward or away from each other the distance between such plates may be also varied according to the requirements of the work. By reason of the construction described it will be observed that the hopper may be adjusted to distribute or feed the molding-sand over any desired area, according to the particular requirements of the work.

The transverse hopper-supporting frame 73 is provided within the upper end of the hopper 70 with intersecting transverse cross-bars 85, on the upper sides of which is fitted a horizontal screen 86, through which the molding-sand is sifted, and said screen is provided on its upper side with a series of concentric scallops 87, which register in the notches 88, formed in the lower edges of a series of radially-disposed distributing wings or blades 89, formed within and carried by the rotary sifter-box 90, arranged to rotate directly over the stationary screen, covering the upper end of the adjustable hopper.

The rotary sifter-box is flared downwardly, so that it will be impossible for the sand to clog therein and at the same time insures a proper distribution of the sand onto the screen, and said sifter-box is provided centrally therein with a socketed bearing-hub 91, snugly receiving the short upwardly-disposed bearing-spindle 92, projected centrally and upwardly from the point of intersection of the cross-bars 85. The box 90 is further provided with an exterior cog-ring 93, which meshes with a horizontal spur-wheel 94, loosely mounted on the upright main shaft 8, and carrying at its lower side a clutch hub or member 95, adapted to be engaged by the upper clutch-collar 96, feathered on the shaft 8 at a point above the lower similar clutch-collar 97, adapted to engage with the clutch-hub 35 of the beveled gear-wheel 34. The spaced clutch-collars 96 and 97 are provided with the annular grooves 98, to loosely receive an intermediate connecting-yoke 99 between the said clutch-collars, and the said yoke has connected thereto, as at 100, one end of an adjusting-lever 101, pivotally supported intermediate of its ends, as at 101$^a$, on a suitable part of the frame of the machine. When the yoke 99 is adjusted so as to engage the clutch-collar 96 with the clutch hub or member 95, the lower clutch-collar 97 will be elevated out of engagement with the clutch hub or member 35, so it will therefore be seen that the rotary mold-table is stationary while the sifter-box is being rotated, and vice versa, so when the mold-table reaches a point so as to dispose a flask-section directly below the adjustable hopper the attendant manipulates the lever 101 so as to stop the rotation of the mold-table and at the same time start the rotation of the rotary sifter-box, so as to sift the molding-sand through the screen 86 and hopper into the flask-section to cover up the half-pattern projecting above the pattern-plate.

The sand is automatically elevated and dumped into the rotary sifter-box 90 by means of a series of elevator-buckets 102, carried by endless elevator-chains 103, arranged to travel over the upper and lower elevator-drums 104 and 105, mounted, respectively, within upper and lower parts of the machine-frame, and the lower of said elevator-drums 105 is disposed at the extreme lower forward end of the frame, so that as the machine automatically advances on the track the elevator-buckets 102 will automatically dig into and gather their own load of sand from a pile of sand S, that is suitably piled up between the rails of the track in front of the advancing machine, and as the said buckets pass over the upper drum 104 the same dump their contents automatically into the sifter-box 90. The upper of said elevator-drums 104 has fitted on one of its shaft extremities a chain-wheel 106, over which passes a short drive-chain 107, driven from a sprocket-wheel 108, mounted on the outer end of a counter-shaft 109, journaled in suitable bearings within the frame and carrying at its inner end a vertically-disposed beveled gear-pinion 110, meshing with a similar pinion 111, mounted horizontally on the upright main shaft 8 to provide means for communicating motion to the endless bucket-elevator simultaneously with the forward propulsion of the machine.

Arranged to work at one side of the adjustable hopper 70 is an oscillating walking-beam 112. The oscillating walking-beam 112 is mounted at a point intermediate of its ends on a suitable supporting-shaft 113, journaled in suitable bearings within the frame of the machine, and said walking-beam has pivotally connected to one end thereof, as at 114, the upper end of an eccentric-rod 115, provided adjacent to its connection with the beam 112 with a turnbuckle 116, providing means for lengthening and shortening the eccentric-rod in order to determine the proper play of the walking-beam 112, and the said eccentric-rod 115 is connected at its lower end to an ordinary eccentric-strap 117, working on the eccentric 118, disposed at one side of and carried with the bevel gear-wheel 33, previously referred to, and thereby completing a gear connection for transmitting motion to the walking-beam 112 simultaneously with the rotation of the mold-table.

Securely bolted to the under side of the walking-beam 112 at the end opposite that connected with the eccentric-rod 115 is a bowed spring 119, the opposite extremities of which curve below the walking-beam and are provided with the hooked extremities 120, to which are connected the opposite ends of a strong leather strap 121, which loosely passes through an eye 122, formed in the upper end or shank 123 of the rammer-head 124. The rammer-head 124 is arranged to reciprocate between suitable guides 125, so as to be held to a steady up-and-down reciprocation, and is designed to work directly into the flask-sections to provide simple and efficient means for tightly packing or ramming the sand down within the flask-section over the pattern therein. A pair of angled arms 126 are respectively supported above and below the walking-beam and extend toward its point of connection with the eccentric-rod 115, and the said angled arms carry rubber or other suitable cushions 127, disposed above and below the walking-beam and forming buffer-cushions to receive the jar incident to the vibration of the walking-beam and thereby relieve the eccentric connections with said walking-beam from undue strain.

By reason of the particular construction of the herein-described machine it will be obvious that two separate sets of attendants may work at the same time—that is, one set of attendants working within the circle of the rotary mold-table and the other set of attendants working on the outside of the mold-table; and another important feature to note is that the construction of the machine is such that there will be no accumulation of sand or dirt at any point to interfere with the operation of forming the mold.

In the operation of the machine it will be understood that the empty flask-sections are fitted on the pattern-plates in the manner herein described, and when an empty flask has passed beneath the adjustable hopper the rotation of the rotary mold-table is stopped and at the same time motion is imparted to the rotary sifter-box 90, so that in rotating the wings or blades 89 within such box will thoroughly distribute the molding-sand over the screen 86 and will cause the same to be properly sifted through the adjustable hopper and into the flask. After a sufficient quantity of the sand has been worked into the flask-section (it of course being remembered that the machine is automatically moving forward and elevating its own feed of sand) by manipulating the lever 101 the rotation of the rotary sifter-box is stopped and motion is given to the rotary mold-table, so as to carry the filled flask-section directly under the rammer-head 124, which is in motion while the mold-table is rotated and consequently reciprocates up and down and tightly packs or rams the sand within the flask as it is carried thereunder, and by the time another empty flask has passed under the hopper the succeeding flask-section will have been completely packed or rammed by the packer, and at this time the rotary table is again stopped and the rotary sifter started, so as to fill the empty flask.

Every time the rotary mold-table stops a completed mold-section will have reached a point directly opposite the adjustable hopper, and at this point the lifting-plate 51 under such completed mold-section will have been adjusted upwardly by the means herein described, so as to elevate the mold-section in order that it may be removed by an attendant and an empty flask-section fitted in place; but it will of course be understood that in drop-pattern work the pattern will have been dropped or withdrawn from the mold-section by the time the same reaches the point opposite the hopper and where it is to be removed by the attendants. During this operation complete molds will be automatically formed and the work automatically progresses until the machine passes entirely across the floor of the foundry, thereby effecting a great saving in time and labor.

The many advantages of the herein-described machine will be readily apparent to those skilled in the art, and it will be noted that various changes in the form, proportion, and the minor details of construction may be resorted to without departing from the principle or sacrificing any of the advantages of this invention.

Having thus described the invention, what is claimed, and desired to be secured by Letters Patent, is—

1. In a sand-molding machine, a track, a wheeled frame traveling on the track and having mold-forming devices, one of the axles of said wheeled frame carrying a worm-wheel, a single upright main shaft mounted vertically within the frame and carrying at its lower end a worm meshing with said worm-wheel and at its upper end a horizontally-disposed grooved drive-pulley, an endless cable supported horizontally above the frame and having a wrap around said horizontally-disposed drive-pulley, the direction of travel of the wheeled frame being determined by the direction of the wrap of the cable around the drive-pulley, an inclined endless bucket elevator mounted at the front end of the frame and providing for elevating and delivering the sand to the mold-forming devices, and a drive connection between the elevator and the upright main shaft, substantially as set forth.

2. In a sand-molding machine, a wheeled base, a rotary skeleton mold-table mounted for rotation on the base and essentially comprising inner and outer vertically-disposed polygonal rims forming a central open space for the use of attendants, pattern-plates successively fitted on the separate sections of the table and bridging the space between the rims thereof, and means for simultaneously advancing the wheeled base and rotating the table thereon, substantially as set forth.

3. In a sand-molding machine, a horizontal wheeled base-ring, a rotary skeleton mold-table mounted for rotation on the base-ring and essentially comprising inner and outer vertically-disposed polygonal rims forming an enlarged central open space for the use of attendants, the outer of said rims having a ball-bearing support at its lower edge on the base-ring, and the inner of said rims being provided at its lower edge with a continuous cog-ring and at its inner side with an annular bearing-shoulder, a series of fixed rollers bearing on said shoulder, pattern-plates successively fitted on the separate sections of the mold-table and bridging the space between the rims thereof, suitably-arranged sand-feeding devices, and a shaft carrying a pinion meshing with the cog-ring of the mold-table, substantially as set forth.

4. In a sand-molding machine, a horizontal base-ring, a skeleton polygonal rotary mold-table having vertically-disposed inner and outer rims, separate pattern-plates detachably secured to the upper edges of the said rims and bridging the space therebetween, each of said pattern-plates being provided at opposite points with perforations, separate sets of shouldered adjusting-pins arranged to work in perforations of alternate pattern-plates to engage with the perforated ears of the drag-sections of the flasks, separate sets of tubular or hollow adjusting-pins working in perforations of the pattern-plates alternating with those accommodating the shouldered pins and adapted to receive the studs or pins of the cope-sections of the flasks, means for automatically raising and lowering each set of adjusting-pins for each pattern-plate, and suitably-arranged sand-feeding devices, substantially as set forth.

5. In a sand-molding machine, a horizontal base-ring, a rotary mold-table mounted on said ring, successively-arranged pattern-plates fitted on said table and each provided at its opposite side edges with perforated ears, a separate vertically-movable lifting-plate arranged under each pattern-plate and carrying a set of upwardly-disposed pins fitting in the perforated ears of the pattern-plate and adapted to interlock with the flask-section supported on the pattern-plate, automatically-operated adjusting devices arranged under each lifting-plate and brought into play at a certain point in the rotation of the rotary table, and suitably-arranged sand-feeding devices, substantially as set forth.

6. In a sand-molding machine, a horizontal base-ring, a rotary mold-table mounted on said ring, and essentially comprising inner and outer polygonal rims and a pair of cross-bars arranged between and connecting the parallel sections of the two rims, the said cross-bars being provided at a central point with vertically-disposed guide-openings, successively-arranged pattern-plates fitted on the separate sections of the table and each provided at opposite points with perforations, a vertically-movable lifting-plate arranged under each pattern-plate and carrying a set of pins fitting in the perforations of the pattern-plate and adapted to engage with the flask-section supported thereon, depending guide-rods connected at their upper ends to each lifting-plate near its opposite ends and projecting through the guide-openings of said cross-bars, springs arranged on said guide-rods below the cross-bars to provide for normally depressing the lifting-plate, automatically-operated adjusting devices arranged under each lifting-plate to provide for the automatic elevation thereof at a certain point in the rotation of the rotary table, and suitably-arranged sand-feeding devices, substantially as set forth.

7. In a sand-molding machine, a horizontal base-ring, a skeleton polygonal rotary mold-table mounted on said ring, pattern-plates successively fitted on the separate sections of the polygonal table and each provided at opposite points with perforations, a spring-retracted lifting-plate arranged under each pattern-plate and carrying a set of adjusting-pins fitting in the perforations of said pattern-plate, a pair of oppositely-located rock-shafts mounted within each section of the table below each lifting-plate, oscillating adjusting-levers mounted at an intermediate point of their ends on said oppositely-located rock-shafts and carrying at their upper ends rollers bearing under the lifting-plate directly thereabove, a connecting-rod pivotally connected at one end to the lower extremity of one adjusting-lever and at its opposite end to the upper extremity of the directly opposite adjusting-lever below the same lifting-plate, a fixed strike-arm arranged in the path of the lower ends of the oppositely-connected adjusting-levers so as to be successively engaged by both of said levers as the mold-table rotates, and suitably-arranged sand-feeding devices, substantially as set forth.

8. In a sand-molding machine, a horizontal base-ring, a skeleton polygonal rotary mold-table mounted on said ring, pattern-plates fitted on the separate sections of the table, a spring-retracted lifting-plate arranged under each pattern-plate and carrying a set of adjusting-pins engaging with the flask-section supported on the pattern-plate, wear-plates detachably fitted on the under side of each lifting-plate and provided at their opposite ends with depending stop-shoulders, opposite pairs of simultaneously-movable adjusting-levers supported to oscillate under each lifting-plate and carrying at their upper ends rollers bearing on said wear-plates and against the shoulders thereof, a suitably-arranged fixed strike-arm adapted to be engaged by the lower ends of certain of said adjusting-levers to provide for the oscillation of the opposite pairs of such levers in two directions, and suitably-arranged sand-feeding devices, substantially as set forth.

9. In a sand-molding machine, the mold-table, and a sand-feeding hopper supported above the table and comprising separate pairs of pivotally-suspended independently-swinging side and end plates, and a combined lock and adjusting device connecting said side and end plates, substantially as set forth.

10. In a sand-molding machine, the mold-table, and a sand-feeding hopper supported above the table and essentially comprising a pair of opposite adjustable side plates pivotally supported at their upper edges, a pair of opposite adjustable end plates pivotally supported at their upper edges and arranged to work between the opposite ends of the side plates, a pair of corner-plates pivotally mounted on each end plate and bearing against the side plates to close in the corners of the hopper, and a combined lock and adjusting device connecting said side and end plates, substantially as set forth.

11. In a sand-molding machine, the mold-table, and a sand-feeding hopper supported above the table and essentially comprising a pair of opposite side plates pivotally supported at their upper edges and provided at their lower edges with offstanding slide-flanges, a pair of opposite end plates pivotally supported at their upper edges and arranged to work between the opposite ends of the side plates, said end plates being provided at their lower edges with outturned guide-flanges, a pair of corner-plates pivotally mounted on each end plate at their upper outer corners and having their lower edges working in said outturned guide-flanges, slide-bars arranged between each pair of corner-plates and having bifurcated ends slidably engaging the inner edges of said corner-plates, a pair of adjusting-bars arranged outside of each end plate and provided with lower hooked ends passed under the lower edges of the side plates and slidably engaged with said slide-flanges thereof, said adjusting-bars intersecting each other at one side of said slide-bars, and thumb-screws passed through the intersecting ends of the adjusting-bars and engaging with said slide-bars to lock these several parts together, substantially as set forth.

12. In a sand-molding machine, the mold-table, a sand-feeding hopper supported in a fixed position above said table and provided at its upper end with a horizontal screen, having a scalloped surface and a rotary sifter-box supported to rotate over the upper end of the hopper and provided with an interior series of distributing-wings having their lower edges registering with the scalloped surface of said screen, substantially as set forth.

13. In a sand-molding machine, the mold-table, a sand-feeding hopper supported in a fixed position above the table and having in its upper end transverse cross-bars supporting a short upwardly-disposed bearing-spindle, a horizontal screen fitted on said cross-bars and provided on its upper side with a series of concentric scallops, and a rotary sifter-box provided centrally therein with a socketed bearing-hub receiving said bearing-spindle and with a series of radially-disposed distributing wings or blades having notched lower edges registering with the scallops of said screen, substantially as set forth.

14. In a sand-molding machine, a suitably-supported rotary mold-table having a cog-ring, a sand-feeding hopper supported above said table and provided at its upper end with a horizontal screen, a sifter-box supported to rotate over said screen and provided with an exterior cog-ring, a suitably-driven upright main shaft, a horizontal spur-wheel mounted on said shaft and meshing with the cog-ring of the sifter-box, said spur-wheel carrying at one side a clutch-hub, a bevel gear-wheel mounted on the main shaft below the spur-wheel and provided at its upper side with a clutch-hub, a suitably-mounted short counter-shaft carrying at one end a pinion meshing with the cog-ring of the mold-table and at its other end a beveled gear-wheel meshing with the similar wheel on the main shaft, and a pair of simultaneously-adjusted spaced clutch-collars mounted on the main shaft between the spur and beveled gear-wheels, and adapted to respectively engage at different times the clutch-hubs of said spur and beveled gear-wheel, substantially as set forth.

15. In a sand-molding machine, a suitably-supported rotary mold-table, sand-feeding devices, an oscillating walking-beam pivotally supported between its ends at one side of the sand-feeding devices, a bowed spring secured between its ends to one end of the walking-beam and provided with hook extremities, stationary guides arranged below the walking-beam, a rammer-head having a vertical reciprocation between the fixed guides and provided with a shank portion having an eye therein, a flexible strap passed through the eye of the rammer-shank and connected to the hook extremities of the spring, an operating connection with the end of the walking-beam opposite the end carrying the rammer-head, and a pair of angled arms respectively arranged above and below the walking-beam and carrying buffer-cushions disposed adjacent to the beam at one side of its pivotal support, substantially as set forth.

In testimony that I claim the foregoing as my own I have hereto affixed my signature in the presence of two witnesses.

THOMAS JOSEPH RYAN.

Witnesses:
T. C. COSTELLO,
WILLIAM F. SHEEHAN.